(12) United States Patent
Tarchinski et al.

(10) Patent No.: US 8,916,990 B2
(45) Date of Patent: Dec. 23, 2014

(54) FUNCTIONAL HIGH-VOLTAGE INTERLOCK SYSTEM AND METHOD

(75) Inventors: James E. Tarchinski, Rochester Hills, MI (US); Gery J. Kissel, Northville, MI (US); William J. Omell, Washington Township, MI (US); Ronald W. Young, Whittier, CA (US)

(73) Assignee: Gem Global Technology Operations LLC, Detroit, MI (US)

( * ) Notice: Subject to any disclaimer, the term of this patent is extended or adjusted under 35 U.S.C. 154(b) by 1073 days.

(21) Appl. No.: 12/561,387

(22) Filed: Sep. 17, 2009

(65) Prior Publication Data

US 2011/0062798 A1    Mar. 17, 2011

(51) Int. Cl.
*F16P 3/20* (2006.01)
*B60L 3/04* (2006.01)
*B60L 3/00* (2006.01)

(52) U.S. Cl.
CPC .... *B60L 3/00* (2013.01); *B60L 3/04* (2013.01)
USPC ............................ 307/10.1; 307/9.1; 307/328

(58) Field of Classification Search
CPC ....................................................... B60L 3/00
USPC .................. 307/328, 10.1; 340/532
See application file for complete search history.

(56) References Cited

U.S. PATENT DOCUMENTS

| 7,751,965 B2* | 7/2010 | Ando et al. ................... 701/113 |
| 2010/0123573 A1* | 5/2010 | Cawthorne et al. ........... 340/532 |

* cited by examiner

*Primary Examiner* — Rexford Barnie
*Assistant Examiner* — Toan Vu
(74) *Attorney, Agent, or Firm* — Ingrassia Fisher & Lorenz, P.C.

(57) ABSTRACT

Methods and apparatus are provided for a functional high-voltage interlock system. The apparatus includes an enclosure, a high-voltage terminal, a low-voltage circuit, and a control circuit. The enclosure includes an access point that may be breached. The high-voltage terminal is disposed at least partially within the enclosure, is accessible by breaching the high-voltage access point, and is configured to be energized from a high-voltage electrical power source. The low-voltage circuit is disposed within the enclosure, and is coupled to selectively receive a low-voltage electrical signal. The control circuit is coupled to, and is configured to supply the low-voltage electrical signal to, the low-voltage circuit only when the high-voltage access point is not breached. The control circuit implements a first function and a disparate second function. The first function determines whether the access point is breached and, if so, prevents the high-voltage terminal from being energized from the high-voltage electrical source.

18 Claims, 3 Drawing Sheets

FUNCTIONAL HIGH-VOLTAGE INTERLOCK SYSTEM AND METHOD

TECHNICAL FIELD

The present invention generally relates to high-voltage access protection, and more particularly relates to a system and method that integrates a high-voltage interlock function with one or more disparate functions.

BACKGROUND OF THE INVENTION

The automotive industry is increasingly using electrical systems to provide at least a portion of the propulsion power for automotive vehicles. These electrical systems typically use high voltage, which is generally defined as direct current (DC) voltage of at least 60 VDC or alternating current (AC) voltage of at least 30 VAC.

Protection against unintended access to high voltage may be provided is via a dedicated high-voltage interlock (HVIL) circuit, or a combination of dedicated loop and localized loops where deemed appropriate. A localized HVIL loop is used to protect one or more high voltage access points, but a subset of the total number of vehicle access points. Localized HVIL loops are used when that subset can have a different response to HVIL breach event, or when physical HVIL implementation can be more economically achieved. For example, localized HVIL could be used in a HV-based air conditioner, where the detected breech of HVIL might trigger a shutdown of only the air conditioning system. An HVIL circuit is a low-voltage circuit. The HVIL circuit typically includes a dedicated circuit loop that is routed to an associated access point, such as component covers or high-voltage connectors, which allow personnel access to high-voltage. The HVIL circuit loop is energized with a low-voltage signal and is configured to be open-circuited when its associated access point is breached. Whenever the HVIL circuit loop is open-circuited, indicating that the associated access point is breached, the HVIL circuit de-energizes the high-voltage to all of the components associated with the breached access point.

SUMMARY OF THE INVENTION

An apparatus is provided for implementing a functional high-voltage interlock. The apparatus comprises an enclosure, a high-voltage terminal, a low-voltage circuit, and a control circuit. The enclosure includes an access point that may be breached. The high-voltage terminal is disposed at least partially within the enclosure, is accessible by breaching the high-voltage access point, and is configured to be energized from a high-voltage electrical power source. The low-voltage circuit is disposed within the enclosure, and is coupled to selectively receive a low-voltage electrical signal. The control circuit is coupled to, and is configured to supply the low-voltage electrical signal to, the low-voltage circuit only when the high-voltage access point is not breached. The control circuit is further configured to implement a first function and a disparate second function. The first function comprises determining whether the access point is breached and, upon determining that the access point is breached, preventing the high-voltage terminal from being energized from the high-voltage electrical source.

In another embodiment, the apparatus comprises an enclosure, a high-voltage terminal, a low-voltage power source, a low-voltage circuit, and a control circuit. The enclosure has an access point that may be breached. The high-voltage terminal is disposed at least partially within the enclosure and is accessible by breaching the high-voltage access point. The high-voltage terminal is configured to be energized from a high-voltage electrical power source. The low-voltage power source is configured to supply a low-voltage electrical signal. The low-voltage circuit is disposed within the enclosure and is coupled to selectively receive the low-voltage electrical signal. The low-voltage circuit is configured to allow the high-voltage electrical power source to energize the high-voltage terminal only when the low-voltage circuit is receiving the low-voltage electrical signal. The control circuit is disposed within the enclosure and is coupled to receive the low-voltage electrical signal only when the high-voltage access point is not breached. The control circuit is configured to implement a first function and a disparate second function. The first function comprises at least selectively allowing current to flow through low-voltage circuit from the low-voltage power source to thereby energize the low-voltage circuit.

A method is provided for implementing a high-voltage interlock. The method includes energizing a low-voltage circuit with low-voltage electrical power. The low-voltage circuit is configured, upon being energized, to supply a signal. The signal supplied from the low-voltage circuit is to implement a first function and a disparate second function. The first function includes determining whether or not an access point to a high-voltage terminal is breached. The high-voltage terminal is allowed to be electrically energized from a high-voltage electrical power source when the determination of the first function is that the access point is not breached. The high-voltage terminal is prevented from being electrically energized from the high-voltage electrical power source when the determination of the first function is that the access point is breached.

Furthermore, other desirable features and characteristics of the functional high-voltage interlock system and method will become apparent from the subsequent detailed description and the appended claims, taken in conjunction with the accompanying drawings and the preceding technical field and background.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, although the various embodiments are described as being implemented in the context of an automobile, it will be appreciated that one or more of the embodiments may be implemented in numerous and varied other vehicles including, but not limited to, various other terrestrial vehicles, various marine vehicles, various aircraft, and various spacecraft.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that the figures are merely illustrative and may not be drawn to scale.

Figure 1:
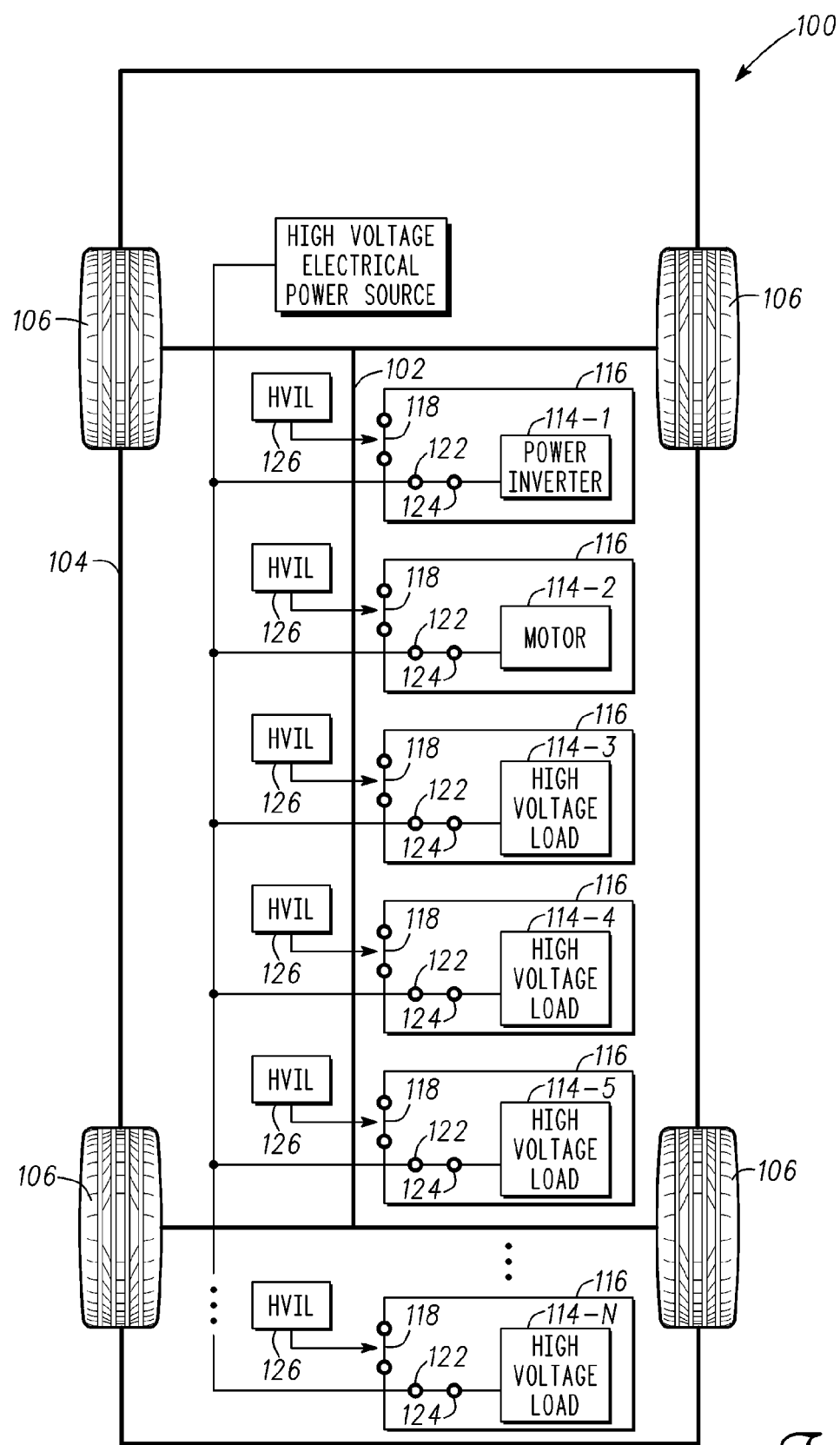
FIG. 1 depicts a simplified schematic representation of a vehicle.

Turning now to FIG. 1, a vehicle 100, or "automobile," according to one embodiment of the present invention is depicted. The automobile 100 includes a chassis 102, a body 104, four wheels 106, and an electrical system 108. The body 104 is arranged on the chassis 102 and substantially encloses the other components of the automobile 100. The body 104 and the chassis 102 may jointly form a frame. The wheels 106 are each rotationally coupled to the chassis 102 near a respective corner of the body 104.

The automobile 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine or fuel cell energy source, a combustion/electric motor hybrid engine, and an electric motor.

The electrical system 108 is a high-voltage electrical system and includes a high-voltage electrical power source 112 and a plurality of high-voltage electrical loads 114. Before proceeding further, it is noted that the term "high-voltage" that is used in this description in the subsequent is defined as direct current (DC) voltage that greater than or equal to 60 VDC or alternating current (AC) voltage that is greater than or equal to 30 VAC. Moreover, the term "low-voltage" that is used in this description in the subsequent is defined as direct current (DC) voltage that less than 60 VDC or alternating current (AC) voltage that is less than 30 VAC.

Returning once again to a description of the electrical system 108, it is noted that the high-voltage electrical power source 112 may be variously implemented. For example, the high-voltage electrical power source 112 may include one or more batteries, one or more fuel cells, one or more generators, or various combinations thereof, just to name a few. Moreover, although only a single high-voltage electrical source 112 is depicted in FIG. 1, it will be appreciated that this is done merely for ease of depiction and description, and that the electrical system 108 may be implemented with a plurality of high-voltage electrical power sources 112, if needed or desired.

The number and type of high-voltage electrical loads 114 may also vary. In the depicted embodiment, however, the high-voltage electrical loads include a power inverter 114-1, a motor 114-2, and one or more other high-voltage electrical loads 114-3, 114-4, 114-5 . . . , 114-N. No matter the specific number of high-voltage electrical loads 114 that are included, a description of the various physical implementations and functions of each of the high-voltage electrical loads 114-1 is not needed to fully describe and enable the invention, and as such will not be provided.

It may additionally be seen that each of the high-voltage loads 114 is disposed, at least partially, within an enclosure 116. The enclosures 116 are each configured with a high-voltage access point 118 that may be breached to allow a technician or other personnel access to the high-voltage load 114 that is disposed (or at least partially disposed) therein, and/or to one or more terminals 122 associated with the high-voltage load 114, and/or to one or more terminals 124 that electrically couple the high-voltage electrical power source 112 to the high-voltage load 114. It will be appreciated that the enclosures 116 and associated high-voltage access points 118 may vary in number, size, and configuration. For example, the high-voltage access points 118 may be configured as a cover or door that, when opened or removed, allows access to the high-voltage load 114 or one or more of the associated terminals 122, 124. Alternatively, the high-voltage access points 118 may be configured as a suitable connector device that electrically connects the high-voltage electrical power source 112 to the high-voltage load 114 via, for example, the associated terminals 122, 124.

As FIG. 1 additionally depicts, the electrical system 108 further includes a plurality of functional high-voltage interlock (HVIL) circuits 126. Each of the functional high-voltage interlock circuits 126 is associated with one of the enclosures 116, and more specifically, with at least one high-voltage access point 118 associated with an enclosure 116. The functional HVIL circuits 126 implement at least two functions—a first function and a disparate second function. The first function, which is described in more detail further below, is a high-voltage interlock function. The second function, which will also be described further below, is disparate from the high-voltage interlock function, but uses the same circuit components and signal(s) that is (are) used to implement the high-voltage interlock function.

A simplified schematic representation of an exemplary functional HVIL circuit 126 is depicted, along with its associated enclosure 116 and high-voltage access point 118, in FIG. 2 and will now be described. Before doing so, however, it is noted that the electrical system 108 may, at least in some embodiments, additionally include one or more HVIL circuits that are not configured as functional HVIL circuits 126. For example, some high-voltage loads 114 may not be suitably configured for, or conducive to, an associated function to be implemented by another circuit, such as the second function that is implemented by the functional HVIL circuits 126 described herein.

Figure 2:
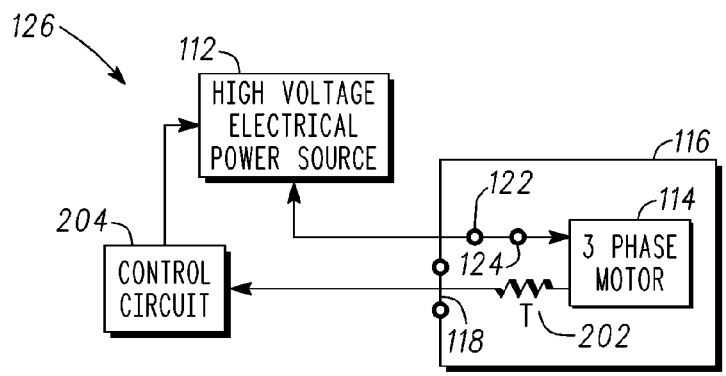
FIG. 2 depicts a simplified functional block diagram of an exemplary functional high-voltage interlock circuit that may be included in the vehicle of FIG. 1.

Moving now to FIG. 2, the exemplary functional HVIL circuit includes a low-voltage circuit 202 and a control circuit 204. The low-voltage circuit 202 is disposed within the enclosure 116, and is selectively coupled to the control circuit 204 via the high-voltage access point 118. More specifically, the low-voltage circuit 202 and the high-voltage access point 118 are configured such that the low-voltage circuit 202 is electrically coupled to the control circuit 204 when the high-voltage access point 118 is not breached, and is not coupled to the control circuit 204 when the high-voltage access point 118 is breached. It will be appreciated that the specific implementation and configuration of the low-voltage circuit 202 may vary. Some exemplary implementations and configurations will be described further below.

The control circuit 204 is configured to selectively supply a low-voltage electrical signal to the low-voltage circuit 202. More specifically, and as was alluded to above, the control circuit 204 is coupled to, and is configured to supply the low-voltage electrical signal to, the low-voltage circuit 202, via the high-voltage access point 118, only when the high-voltage access point 118 is not breached. The control circuit 204 is additionally configured to implement the previously mentioned first function and disparate second function, which are now described in more detail.

The first function that the control circuit 204 implements is, as was previously mentioned, a high-voltage interlock function. In implementing this function, the control circuit 204 determines whether the high-voltage access point 118 has been breached. More specifically, the control circuit 204 is configured to determine whether the low-voltage circuit 202 is receiving the low-voltage electrical signal. If the low-voltage circuit 202 is not receiving the low-voltage electrical signal, this indicates that the high-voltage access point 118 is breached. When the high-voltage access point 118 is breached, it is highly desirable to eliminate the potential (or at least significantly reduce the likelihood) of a high-voltage shock to personnel. Hence, the control circuit 204, upon determining that the high-voltage access point 118 is breached, also prevents the high-voltage load 114 from being energized from the high-voltage electrical power source 112.

Figure 3:
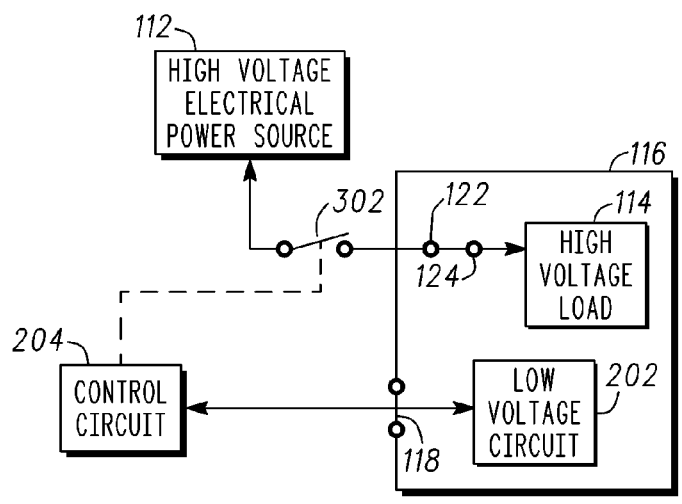
FIGS. 3 and 4 depict simplified functional block diagrams of alternative exemplary functional high-voltage interlock circuits that may be included in the vehicle of FIG. 1.
Figure 4:
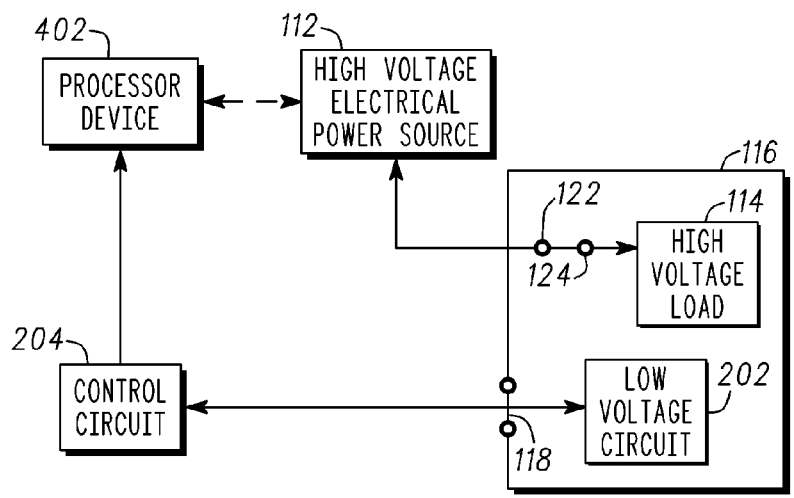

It will be appreciated that the control circuit 204 may be configured in any one of numerous ways to prevent the high-voltage electrical power source 112 from energizing the high-voltage load 114. For example, the control circuit 204 may be configured to supply a signal to completely shutdown the high-voltage electrical power source 112. In such an embodiment, the control circuit 204 may supply a control signal to the high-voltage electrical power source 112, and the high-voltage electrical power source 112 may be responsive to this control signal to shutdown. Alternatively, the control circuit 204 may be configured to disconnect the high-voltage electrical power source 112 from the entire electrical system 108, or to disconnect only the affected high-voltage load 114 from the high-voltage electrical power source 112. In such an embodiment, which is depicted in FIG. 3, the control circuit 204 may supply a control signal to a controllable switch 302 (or equivalent). The controllable switch 302 may in turn be responsive to the control signal to disconnect the high-voltage electrical power source 112 from the entire electrical system 108, or to disconnect only the affected high-voltage load 114 from the high-voltage electrical power source 112. In yet another exemplary and non-limiting embodiment, which is depicted in FIG. 4, the control circuit 204 may be configured to supply a signal to a separate device, such as a central processor 402, which may in turn supply a signal to the high-voltage electrical power source 112 or to a controllable switch 302.

The low-voltage electrical signal that the control circuit 204 uses to implement the first function, herein termed the high-voltage interlock function, is also used in the control circuit 204 to implement the disparate second function. The disparate second function that the control circuit 204 implements, and concomitantly the configuration and implementation of the low-voltage circuit 202, may vary and may depend, for example, on the particular high-voltage load 114. For example, in the embodiment depicted in FIG. 2, the high-voltage load 114 is a three-phase electric motor that is controlled, in part, based on the motor temperature. Hence, the low-voltage circuit 202 is implemented as a suitable temperature sensor, and the disparate second function that the control circuit 204 implements is a temperature sense function, whereby it at least supplies a temperature signal representative of the sensed motor temperature.

Figure 5:
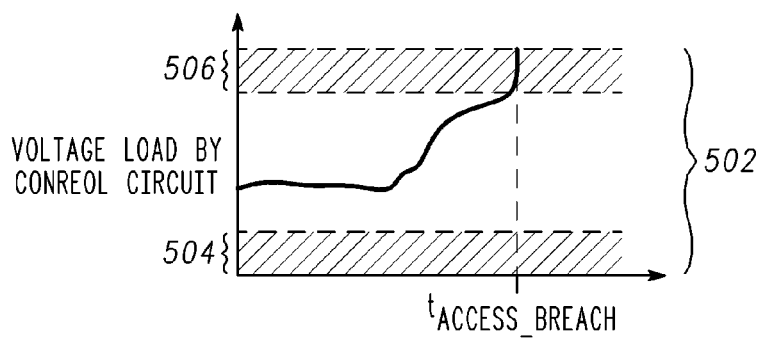
FIG. 5 graphically depicts exemplary operational voltages associated with the exemplary circuits of FIGS. 2-4.

With reference now to FIG. 5, an exemplary manner in which the high-voltage interlock function and the temperature sense function may be integrated will be described. In the depicted embodiment, the temperature sensor (i.e., the low-voltage circuit 202) has an output range 502 that is read by the control circuit 204. Small voltage bands near the ends of the output range are used to diagnose sensor faults. For example, a lower fault band 504 near the low end of the range 502 may be used to diagnose a sensor short-circuit, and an upper fault band 506 near the upper end of the range 502 may be used to diagnose a sensor open-circuit. With this embodiment, however, the upper fault band 506 is instead used to indicate that the high-voltage access point 118 has been breached. In the depicted example, it is thus seen that at time $t_{access\_breach}$ the control circuit 204 would determine that the high-voltage access point 118 has been breached. It will be appreciated that this is merely one exemplary manner in which the control circuit 204 may implement this determination.

Returning once again to FIG. 2, it is again emphasized that the low-voltage circuit 202 may be variously configured and implemented, and that the depicted temperature sensor configuration and implementation is merely exemplary of one particular embodiment. Indeed, in other embodiments the low-voltage circuit 202 may be configured to implement a level sensor, such as an oil (or other fluid) level sensor, a pressure sensor, or any one of numerous other devices for sensing a physical phenomenon. It will be further appreciated that the low-voltage circuit 202 may be configured and implemented as various other types of low-voltage circuits, and not just sensor circuits.

Whether or not the low-voltage circuit 202 is configured and implemented as a sensor or some other type of device, in a preferred embodiment it is preferably configured to implement a mission-critical function. As used herein, the term "mission-critical function" is defined as a function that is needed to ensure the proper operation of at least the high-voltage load 114, and perhaps the high-voltage electrical power source 112 and/or the entire electrical system 108. Thus, a loss of a mission-critical function will result in an automatic shut down of at least the high-voltage load 114, and perhaps the high-voltage electrical power source 112 and/or the entire electrical system 108. With this preferred criterion, system reliability is further improved since the control circuit 204 is further configured to implement the automatic shutdown function should the low-voltage circuit 202 become inoperable.

Consistent with the above, assume that two low-voltage circuits 202 are associated with a high-voltage load 114, and that each is disposed at least partially within the same enclosure 116. Additionally assume that one of the low-voltage circuits 202 (and its associated circuit 204) is used to implement a mission-critical function, whereas the other does not. In such a case, it is preferable to use the mission-critical low-voltage circuit 202, and its associated circuit 204, to additionally implement the HVIL function.

Figure 6:
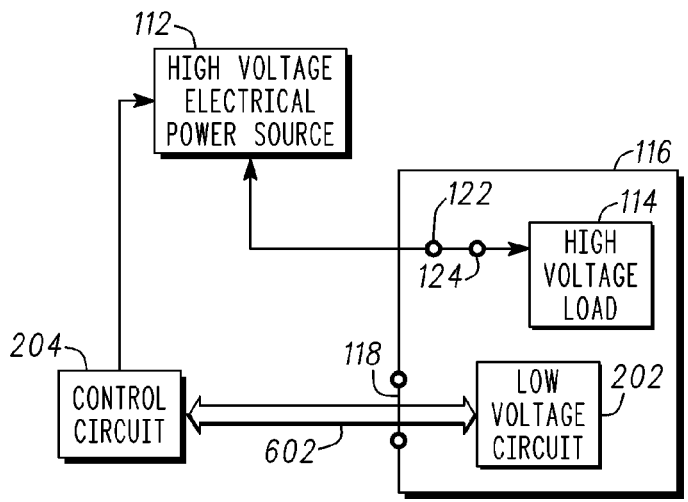
FIGS. 6 and 7 depict simplified functional block diagrams of additional alternative exemplary functional high-voltage interlock circuits that may be included in the vehicle of FIG. 1.
Figure 7:
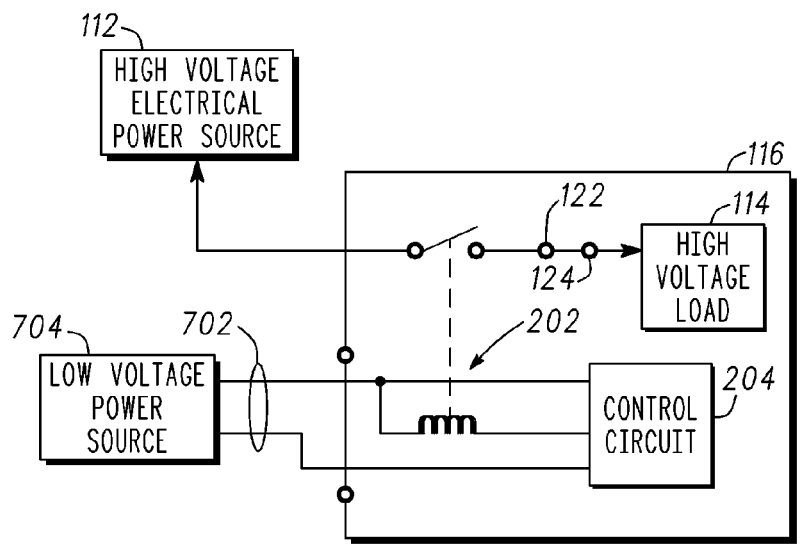

In addition to the embodiments depicted in FIGS. 2-4, various other embodiments, such as those depicted in FIGS. 6 and 7, may also be implemented. The embodiment depicted in FIG. 6, for example, depicts the low-voltage circuit 202 including a digital device that communicates with the control circuit 204 via a digital communication link 602 that runs through the high-voltage access point 118. With this configuration, the control circuit 204 may be configured to determine that the high-voltage access point 118 is breached upon loss of digital communication with the low-voltage circuit 202.

In the embodiment depicted in FIG. 7, a low-voltage power line 702 is routed from a low-voltage power source 704 into the high-voltage enclosure 116 via the high-voltage access point 118. The low-voltage circuit 202 is disposed within the enclosure and is coupled to the low-voltage power source 704 only when the high-voltage access point 118 is not breached. It is seen that the low-voltage circuit 202 is configured to allow the high-voltage electrical power source 112 to energize the high-voltage load 114 only when the low-voltage circuit 202 is being energized from the low-voltage power source 704.

As FIG. 7 also depicts, the control circuit 204 in this embodiment is disposed within the enclosure 116. The control circuit 204 is also coupled to be energized from the low-voltage power source 702 only when the high-voltage access point 118 is not breached. Consistent with the previous embodiments, the control circuit 204 is configured to implement a first function and a disparate second function. Here, however, the first function is allowing current to flow through low-voltage circuit 202 from the low-voltage power source 204 to thereby energize the low-voltage circuit.

The systems and methods described herein implement a high-voltage interlock protection function that does not rely on a dedicated circuit, and thus reduces overall system costs and/or overall weight. To do so, the high-voltage interlock protection function is preferably integrated into another electrical signal that is used to implement a second, disparate function. Although the functional HVIL circuits are depicted and described herein as being associated with, and thus providing protection for, a single access point, it will be appreciated that this is done merely for ease of depiction and description. Indeed, each of the embodiments could be associated with, and thus provide protection for, multiple access points, if needed or desired. Preferably, if a functional HVIL circuit is associated with multiple access points, the access points are generally all in the same physical area. This, however, is merely preferred and not required.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A functional high-voltage interlock system, comprising:
    an enclosure having an access point that may be breached;
    a high-voltage terminal disposed at least partially within the enclosure and being accessible by breaching the high-voltage access point, the high-voltage terminal configured to be energized from a high-voltage electrical power source;
    a low-voltage circuit disposed within the enclosure, the low-voltage circuit coupled to selectively receive a low-voltage electrical signal; and
    a control circuit coupled to, and configured to supply the low-voltage electrical signal to, the low-voltage circuit only when the high-voltage access point is not breached, the control circuit further configured to implement a first function and a disparate second function,
    wherein the first function comprises:
        determining whether the access point is breached, and upon determining that the access point is breached, preventing the high-voltage electrical power source from energizing the high-voltage terminal, and
        the disparate second function comprises sensing one of a temperature, a pressure, or a liquid level.

2. The system of claim 1, wherein the first function further comprises not preventing the high-voltage load from being energized by the high-voltage electrical power source, upon determining that the access point is not breached.

3. The system of claim 1, wherein the low-voltage circuit comprises a sensor device configured to sense the temperature, the pressure, or the liquid level.

4. The system of claim 1, wherein the low-voltage circuit comprises a digital device.

5. The system of claim 1, wherein:
    the disparate second function is a mission-critical function; and
    the control circuit is further configured to determine if the low-voltage circuit is inoperable and, if so, preventing the high-voltage electrical power source from energizing the high-voltage terminal.

6. The system of claim 1, wherein:
    the control circuit supplies a control signal upon determining that the access point is breached; and
    the system further comprises the high-voltage electrical power source, the high-voltage electrical power source configured to be responsive to the control signal to selectively shutdown.

7. The system of claim 1, wherein:
    the control circuit supplies a control signal upon determining that the access point is breached; and
    the system further comprises a switch device electrically coupled to the high-voltage terminal and coupled to receive the control signal from the control circuit, the switch device responsive to the control signal to selectively move between an open position, in which the high-voltage electrical power source is prevented from energizing the high-voltage terminal, and a closed position, in which the high-voltage electrical power source is not prevented from energizing the high-voltage terminal.

8. The system of claim 1, wherein the control circuit supplies a control signal upon determining that the access point is breached; and
    the system further comprises a processor device coupled to receive the control signal and configured, in response thereto, to selectively shutdown the high-voltage electrical power source.

9. A functional high-voltage interlock system, comprising:
    an enclosure having an access point that may be breached;
    a high-voltage terminal disposed at least partially within the enclosure and being accessible by breaching the high-voltage access point, the high-voltage terminal configured to be energized from a high-voltage electrical power source;
    a low-voltage power source configured to supply a low-voltage electrical signal;

low-voltage circuit disposed within the enclosure, the low-voltage circuit coupled to selectively receive the low-voltage electrical signal, the low-voltage circuit configured to allow the high-voltage electrical power source to energize the high-voltage terminal only when the low-voltage circuit is receiving the low-voltage electrical signal; and a control circuit disposed within the enclosure, the control circuit coupled to receive the low-voltage electrical signal only when the high-voltage access point is not breached, the control circuit configured to implement a first function and a disparate second function, wherein:

the first function comprises at least selectively allowing current to flow through low-voltage circuit from the low-voltage power source to thereby energize the low-voltage circuit, and the disparate second function comprises sensing one of a temperature, a pressure, or a liquid level.

10. A functional high-voltage interlock system, comprising:

a high-voltage electrical power source;

an enclosure having an access point that may be breached;

a high-voltage load disposed at least partially within the enclosure and being accessible by breaching the high-voltage access point, the high-voltage load electrically coupled to be energized by the high-voltage electrical power source;

a low-voltage circuit disposed within the enclosure, the low-voltage circuit coupled to selectively receive a low-voltage electrical signal; and a control circuit coupled to, and configured to supply the low-voltage electrical signal to, the low-voltage circuit only when the high-voltage access point is not breached, the control circuit further configured to implement a first function and a disparate second function, wherein the first function comprises:

determining whether the access point is breached, and upon determining that the access point is breached, preventing the high-voltage load from being energized by the high-voltage electrical power source, and the disparate second function comprises sensing one of a temperature, a pressure, or a liquid level.

11. The system of claim 10, wherein the first function further comprises not preventing the high-voltage load from being energized by the high-voltage electrical power source, upon determining that the access point is not breached.

12. The system of claim 10, wherein the low-voltage circuit comprises a sensor device configured to sense the temperature, the pressure, or the liquid level.

13. The system of claim 10, wherein the low-voltage circuit comprises a digital device.

14. The system of claim 10, wherein:

the disparate second function is a mission-critical function; and the control circuit is further configured to determine if the low-voltage circuit is inoperable and, if so, preventing the high-voltage load from being energized by the high-voltage electrical power source.

15. The system of claim 10, wherein:

the control circuit supplies a control signal upon determining that the access point is breached; and the high-voltage electrical power source is configured to be responsive to the control signal to shutdown.

16. The system of claim 10, wherein:

the control circuit supplies a control signal upon determining that the access point is breached; and the system further comprises a switch device electrically coupled between the high-voltage electrical power source and the high-voltage load, the switch device further coupled to receive the control signal from the control circuit, the switch device responsive to the control signal to selectively move between an open position, in which the high-voltage electrical power source is prevented from energizing the high-voltage load, and a closed position, in which the high-voltage electrical power source is not prevented from energizing the high-voltage load.

17. The system of claim 1, wherein the control circuit supplies a control signal upon determining that the access point is breached; and the system further comprises a processor device coupled to receive the control signal and configured, in response thereto, to selectively shutdown the high-voltage electrical power source.

18. A method of implementing a high-voltage interlock, the method comprising the steps of:

energizing a low-voltage circuit with low-voltage electrical power, the low-voltage circuit configured, upon being energized, to supply a low-voltage signal;

using the low-voltage signal supplied from the low-voltage circuit to implement a first function and a disparate second function, the first function comprising determining whether or not an access point to a high-voltage terminal is breached, the disparate second function comprising sensing one of a temperature, a pressure, or a liquid level;

allowing the high-voltage terminal to be electrically energized from a high-voltage electrical power source when the determination of the first function is that the access point is not breached; and preventing the high-voltage terminal from being electrically energized from the high-voltage electrical power source when the determination of the first function is that the access point is breached.

* * * * *